(12) United States Patent
Demerath

(10) Patent No.: US 12,296,652 B2
(45) Date of Patent: May 13, 2025

(54) AIR VENT FOR A VEHICLE

(71) Applicant: ILLINOIS TOOL WORKS INC., Glenview, IL (US)

(72) Inventor: Michael Demerath, Hüffler (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 635 days.

(21) Appl. No.: 17/275,930

(22) PCT Filed: Sep. 13, 2019

(86) PCT No.: PCT/US2019/050942
§ 371 (c)(1),
(2) Date: Mar. 12, 2021

(87) PCT Pub. No.: WO2020/060849
PCT Pub. Date: Mar. 26, 2020

(65) Prior Publication Data
US 2022/0032737 A1    Feb. 3, 2022

(30) Foreign Application Priority Data
Sep. 19, 2018 (DE) ..................... 10 2018 122 999.2

(51) Int. Cl.
*B60H 1/34* (2006.01)
*F24F 13/15* (2006.01)

(52) U.S. Cl.
CPC ..................... *B60H 1/3421* (2013.01); *B60H 2001/3471* (2013.01); *F24F 13/15* (2013.01)

(58) Field of Classification Search
CPC ........... B60H 1/3421; B60H 2001/3471; F24F 13/15
(Continued)

(56) References Cited

U.S. PATENT DOCUMENTS 10,414,246 B2 *  9/2019  Shibata ................ B60H 1/3421
2014/0357178 A1   12/2014  Doll
(Continued)

FOREIGN PATENT DOCUMENTS

DE       102011003435 A1    8/2012
DE       102013210053 B3    9/2014
(Continued)

OTHER PUBLICATIONS

PCT, International Search Report and Written Opinion, International Application No. PCT/US2019/050942; date of mailing Nov. 26, 2019, 12 pages.

*Primary Examiner* — Allen R. B. Schult
(74) *Attorney, Agent, or Firm* — THOMPSON HINE LLP

(57) ABSTRACT

An air vent (100) for a vehicle, wherein the air vent (100) has a housing (1a, 1b) with an air inlet region (3) and an opposite air outlet region (5), wherein a housing wall of the housing (1a, 1b) delimits, at least in certain regions, an air duct (7) for air flowing from the air inlet region (3) to the air outlet region (5) along a main flow direction (H), upstream of the air outlet region (5), the air duct (7) is subdivided into at least two sub-ducts (9a, 9b) which extend in parallel along the main flow direction (H) and which open into a respective air outlet opening (6a, 6b) at the air outlet region (5) and for air deflection as required, at least one adjustable air-guiding element (11a, 11b) is arranged in each sub-duct (9a, 9b).

16 Claims, 6 Drawing Sheets

(58) Field of Classification Search
USPC .......................................................... 454/155
See application file for complete search history.

(56) References Cited

U.S. PATENT DOCUMENTS

2016/0152116 A1    6/2016  Albin
2016/0288624 A1*  10/2016  Albin .................... B60H 1/3421
2017/0021692 A1*  1/2017  Terai .................. B60H 1/00535

FOREIGN PATENT DOCUMENTS

| DE | 202015102026 U1 | 6/2015 |
| DE | 202013012285 U1 | 1/2016 |
| DE | 102015120290 A1 | 6/2016 |
| DE | 102017111011 A1 | 7/2017 |
| JP | 2017213955 A | 12/2017 |

* cited by examiner

AIR VENT FOR A VEHICLE

TECHNICAL FIELD

The present invention relates to an air vent, in particular for a venting system of a vehicle. Furthermore, the invention relates to a venting system having such an air vent.

BACKGROUND

In ventilation devices for vehicles, use is generally made of air vents or air outlet nozzles, which allow deliberate control of the emerging air jet. Such air vents serve to deliver in particular fresh air into a vehicle interior.

The air flow in this case flows via an inlet opening of the air vent into the air duct delimited by the housing wall of the air vent, through said air duct and finally through the outlet opening of the air vent into the interior of a vehicle (for example passenger car or truck). The air flow basically follows a main flow direction in this case, which can extend in particular parallel to a longitudinal axis of the housing. In known air vents, the air flow is deflected from the main flow direction by one or more air-guiding elements, for example pivotable air-guiding slats. In order to deflect the air from the main flow direction, it is possible, in addition to the air-guiding elements, to also use the housing delimiting the air duct.

Thus, air vents are known in which the housing walls extend in an arcuate manner toward one another, wherein an air flow directed toward the arcuate housing wall by an air-guiding element follows the arc shape and thus undergoes a corresponding deflection.

Air vents of this kind are known for example from DE 20 2015 102 026 U1, DE 20 2013 012 285 U1, and DE 10 2017 111 011 A1.

On account of the arcuate configuration of the housing wall, such air vents are very complicated to produce, however, in particular by way of a plastic injection-molding process.

Furthermore, in particular the air vent known from DE 20 2015 102 026 U1 has particular drawbacks with regard to the visual appearance and with regard to the required safety of the vehicle occupants. This is because the outlet opening of the known air vents has to be embodied in a relatively large manner in order to be able to ensure an appropriately high flow rate of the air quantity to be introduced into the interior of the vehicle. In air vents with relatively large outlet openings, however, there is in principle the risk of objects being able to pass unintentionally into the air vent counter to the main flow direction. In particular, there is an increased risk of injury when the outlet opening of the air vent is so large that a vehicle occupant, in particular a child, can put their fingers into the outlet opening.

Apart from these drawbacks relating to the safety of the vehicle occupants, the air vents known from the prior art have design-related drawbacks as regards the air deflection. Thus, in the known air vents, the air is diverted multiple times for example even when the air-guiding elements are in the straight-ahead position, this resulting in increased flow resistance. As a result, the action of the air-guiding elements is greatly impaired in particular for horizontal air deflection. Moreover, as a result of the increased flow resistance, the emerging air flow is flared in front of the outlet opening of the air vent, this likewise not being desired.

SUMMARY

Proceeding from the above problems, the present invention is based on the object of developing an air vent of the type mentioned at the beginning such that optimized air deflection is ensured, wherein occupant safety is intended to be improved at the same time.

This object is achieved according to the invention by the subject matter of independent claim 1, wherein advantageous developments of the air vent according to the invention are specified in the dependent claims.

Accordingly, the present invention relates in particular to an air vent for a vehicle, wherein the air vent has a housing with an air inlet region and an air outlet region opposite the latter. As is the case in the known air vents, in the air vent according to the invention, a housing wall of the housing delimits, at least in certain regions, an air duct for the air flowing from the air inlet region to the air outlet region along a main flow direction.

In contrast to the air vents known from the prior art, however, in the air vent according to the invention, upstream of the air outlet region of the air vent, the air duct is subdivided into at least two sub-ducts which extend in parallel along the main flow direction. At the air outlet region of the air vent, each sub-duct then opens into a respective separate outlet opening.

In this way, it is possible to choose the air outlet area of the air vent to be relatively large, while, however, at the same time the cross-sectional areas of the individual outlet openings are preferably chosen to be small enough that the fingertip of a vehicle occupant can no longer be fitted into the preferably slotlike outlet openings.

Also provided according to the invention is that at least one, and preferably precisely one, adjustable, and in particular pivotable, air-guiding element is arranged in each sub-duct, in order to deflect the air flowing through the corresponding sub-duct as required.

The subdivision of the air duct into a plurality of sub-ducts which extend in parallel and up to the air outlet region of the air vent has not only the safety-related advantage that the dimensions of the (in particular slotlike) outlet openings of the individual sub-ducts can be chosen to be so small at the air outlet region of the air vent that for example a fingertip can effectively no longer be put into the outlet opening, but also has other advantages in terms of optimized air deflection and in particular air flow that is as low-resistance as possible. This is because the sub-ducts each have in the main flow direction a cross-sectional geometry which, compared with the cross-sectional geometry of the air duct before the subdivision thereof into the sub-ducts, has a much lower height (with the same width).

Given that, according to the invention, for air deflection as required, preferably precisely one adjustable, and in particular pivotable, air-guiding element is arranged in each sub-duct, this air-guiding element can, on account of the relatively low height of the corresponding sub-duct (with the width remaining the same), be placed much closer to the corresponding outlet opening, this having the result that the air deflection can be improved, specifically compared with solutions in which no sub-ducts are provided.

In order to subdivide the air duct into the at least two sub-ducts, use is preferably made of at least one separating web which extends along the main flow direction, is arranged between two adjacent sub-ducts, and extends up to the air outlet region of the air vent. Of course, however, other constructions or solutions are also conceivable in order to form the sub-ducts. Preferably, the division between the sub-ducts should be embodied such that, via this division, air exchange between the adjacent sub-ducts is not possible.

The air-guiding element arranged in each sub-duct is designed preferably as an air-guiding slat which is pivotable relative to the housing of the air vent between two end positions about an axis of rotation extending perpendicularly to the main flow direction. The axis of rotation of each air-guiding element designed in particular as an air-guiding slat extends preferably through an end region, which faces the air outlet region, of the respective air-guiding element. In the two end positions of the air-guiding element, the opposite end region of the air-guiding element should in this case butt against corresponding stops which are connected to the wall forming the corresponding sub-duct or are formed by the corresponding wall, in order, in one of the end positions, to effect as full diversion of the entire air flow flowing through the sub-duct as possible.

In one advantageous embodiment of the air vent according to the invention, each sub-duct is assigned at least one projection or narrowing in the air outlet region, which projection protrudes into the corresponding sub-duct, at least in certain regions, in such a way that the cross-sectional area of the sub-duct is reduced in the main flow direction. The air-guiding elements arranged in each sub-duct are in this case each preferably designed in such a way that, at least in one of the end positions thereof, the air flowing through the sub-duct is directed from the main flow direction in the direction of the at least one projection assigned to the corresponding sub-duct or in the direction of the at least one narrowing assigned to the corresponding sub-duct.

Alternatively or additionally thereto, it is conceivable for each sub-duct to be formed, at least in certain regions, by a wall element which is curved in the direction of the air outlet region, wherein the air-guiding elements arranged in each sub-duct are each designed in such a way that, at least in one of the end positions, the air flowing through the sub-duct is directed from the main flow direction in the direction of the wall element which is curved in the direction of the air outlet region. In this embodiment, it is possible to dispense with corresponding projections that project into the corresponding sub-duct, at least in certain regions, in such a way that the cross-sectional area of the sub-duct is reduced in the main flow direction.

In this connection, it is conceivable for the air-guiding elements assigned to the sub-ducts each to be designed to deflect the air flow through the respective sub-duct from the main flow direction in particular into a direction perpendicular to the main flow direction, i.e. to confer on the air flow a directional component in a direction perpendicular to the main flow direction. As a result, the direction of the air flow can be toward the projection protruding into the corresponding sub-duct, at least in certain regions, or toward the narrowing protruding into the corresponding sub-duct, at least in certain regions. The at least one projection/narrowing protruding into the sub-duct, at least in certain regions, then deflects the air flow in turn in a different direction.

This embodiment is based on the finding that a projection protruding into the sub-duct, at least in certain regions, or a narrowing protruding into the sub-duct, at least in certain regions, also allows reliable air deflection, in a similar manner to the air deflection caused by an arcuate housing wall. This is in particular because, in the case of the projection protruding into the sub-duct, at least in certain regions, an air cushion is brought about by one or more air vortices. The air flow directed by the air-guiding element assigned to the sub-duct in the direction of the corresponding projection or the corresponding narrowing is, on account of the air cushion formed at the projection protruding into the sub-duct, at least in certain regions, or formed at the narrowing protruding into the sub-duct, at least in certain regions, guided/diverted in a similar manner to when it meets an arcuate housing wall, but, as a result of the provision of such a projection, a greater deflection angle of the emerging air is achieved. In this way, the air flowing through the sub-duct can be diverted more effectively.

In particular, in the air vent according to the invention, the air duct, upstream of the air-guiding elements respectively assigned to the sub-ducts, is not subdivided into sub-ducts, but rather is delimited there by the housing wall of the housing of the air vent.

In embodiments of the air vent according to the invention, in the region in which the air duct—as seen in the main flow direction—is not yet subdivided into the sub-ducts, at least one further air-guiding element and preferably an assembly of several further air-guiding elements is provided. This further air-guiding element or these further air-guiding elements is/are pivotable relative to the housing of the air vent and relative to the air-guiding elements assigned to the sub-ducts about an axis of rotation which extends perpendicularly to the main flow direction and perpendicularly to the axis of rotation of the air-guiding elements assigned to the sub-ducts.

Alternatively thereto, it is conceivable that, upstream or downstream of the air-guiding elements respectively assigned to the sub-ducts, at least one further air-guiding element and preferably an assembly of further air-guiding elements is provided in preferably each sub-duct, wherein the further air-guiding element or the further air-guiding elements is/are pivotable relative to the housing of the air vent and relative to the other air-guiding elements assigned to the sub-ducts about an axis of rotation which extends perpendicularly to the main flow direction and perpendicularly to the axis of rotation of the air-guiding elements assigned to the sub-ducts.

In embodiments in which the air vent is provided with further air-guiding elements, according to embodiments, the axis of rotation of the at least one further air-guiding element can extend through an end region, which faces the air outlet region of the air vent, of the at least one further air-guiding element. However, in this connection, embodiments in which the axis of rotation of the at least one further air-guiding element extends through a middle region of the at least one further air-guiding element are also conceivable.

In preferred embodiments of the air vent according to the invention, use is made of a plurality of further air-guiding elements upstream of the air-guiding elements respectively assigned to the sub-ducts, wherein these further air-guiding elements are assigned a synchronization mechanism in order to synchronize a pivoting movement of the further air-guiding elements. In the same way, it is advantageous for the air-guiding elements respectively assigned to the sub-ducts likewise to be assigned a corresponding synchronization mechanism in order to enable a pivoting movement of these air-guiding elements assigned to the sub-ducts.

In a preferred realization of the air vent according to the invention, the air-guiding elements assigned to the sub-ducts are each designed to deflect the air flowing through the corresponding sub-duct from the main flow direction in a first direction extending perpendicularly to the main flow direction. In this preferred realization of the air vent according to the invention, the at least one further air-guiding element is designed to deflect the air flowing through the air duct from the main flow direction in a second direction perpendicular to the first direction. Preferably, a corresponding actuating mechanism is assigned to the air vent, in order to accordingly pivot as required the air-guiding elements assigned to the sub-ducts and/or the at least one further air-guiding element, in order as a result to deflect air in the first and/or second direction.

BRIEF DESCRIPTION OF THE DRAWINGS

In the following text, exemplary embodiments of the air vent according to the invention are described in more detail with reference to the accompanying drawings.

In the drawings.

Figure 1:
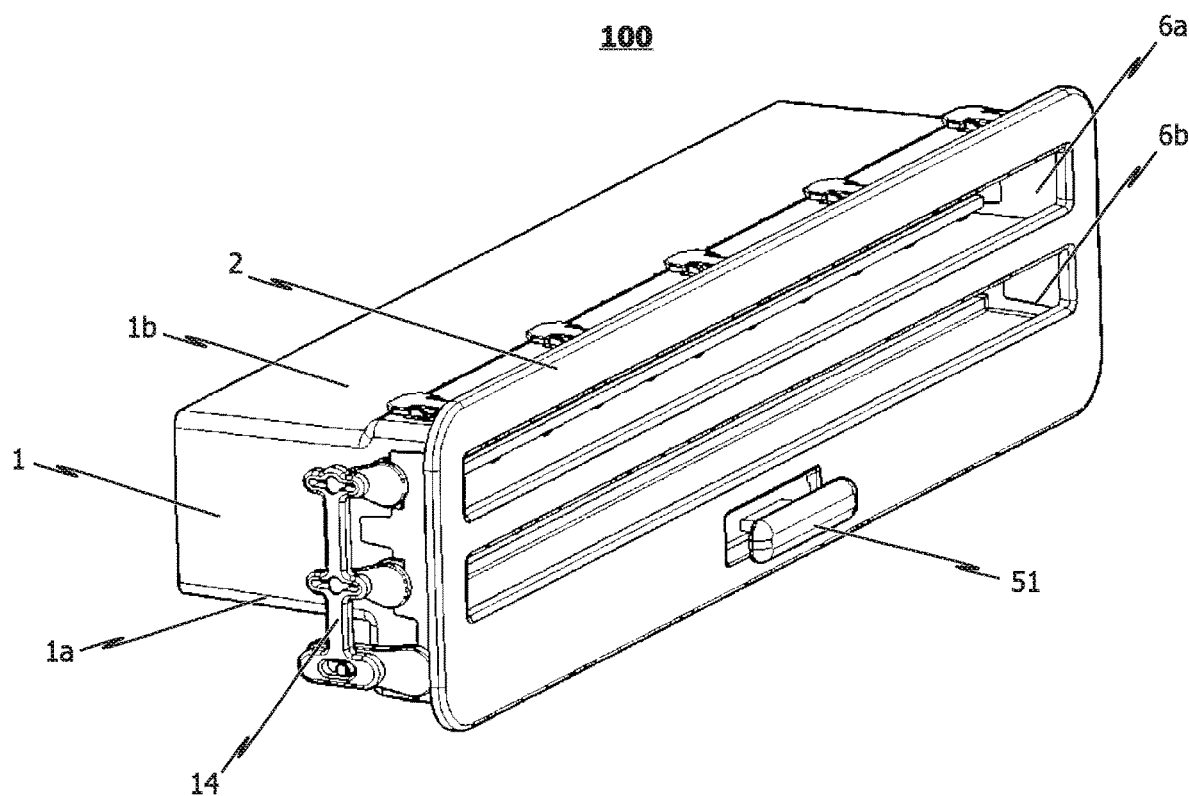
FIG. 1 schematically shows an isometric view of an exemplary embodiment of the air vent according to the invention.

Unless stated otherwise, identical reference signs denote the same objects in the following text.

DETAILED DESCRIPTION

FIGS. 1 to 4 schematically show a first exemplary embodiment of the air vent 100 according to the invention. The air vent 100 has a housing 1 with a housing main body and a cover panel 2. The housing main body can be subdivided into a housing lower part 1a and a housing upper part 1b that is separable from the housing lower part 1a.

The housing 1 has an air inlet region 3 with a (single) air inlet opening 4 and an air outlet region 5 located on the opposite side from the air inlet region 3. In the air outlet region 5 a total of two air outlet openings 6a, 6b that are arranged in this case one above the other are provided.

Figure 3:
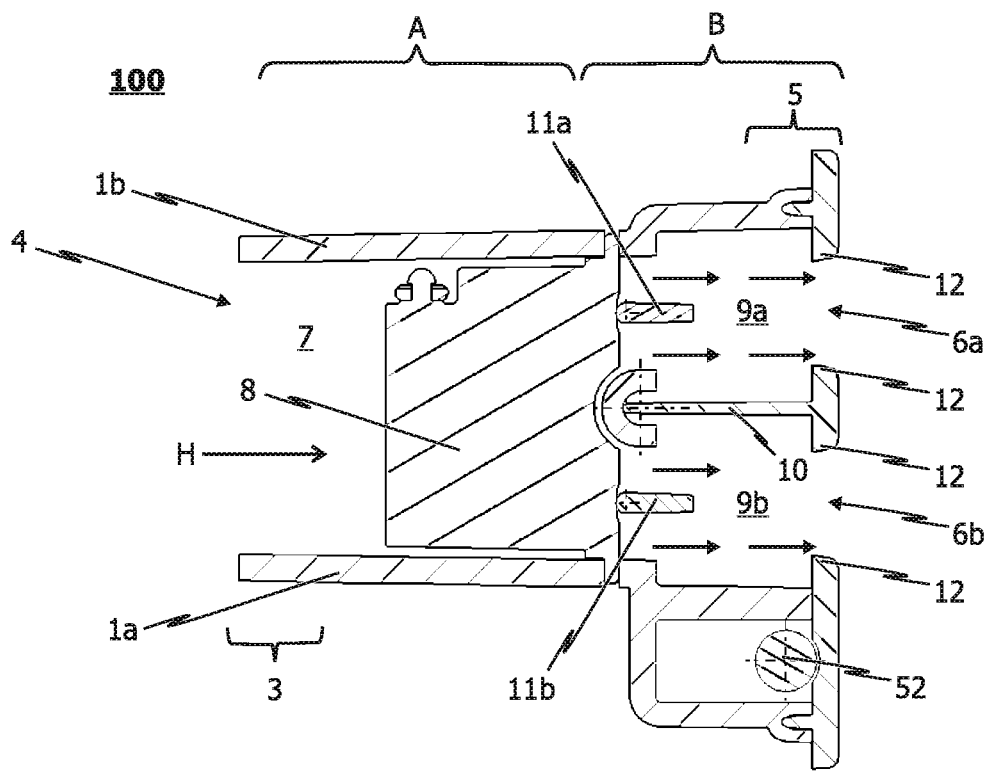
FIG. 3 schematically shows a view in longitudinal section of the exemplary embodiment of the air vent according to the invention according to FIG. 1, wherein the air-guiding slats of the air vent are each in their neutral position ("straight-ahead position")

As can be gathered from the schematic sectional view for example according to FIG. 3, in an end region of the air vent 100, which faces the air inlet region 3 of the air vent 100, a single air duct 7 is formed preferably by the housing wall of the housing 1. Specifically, in this exemplary embodiment, a housing wall belonging to the housing upper part 1b and a housing wall located opposite the housing wall delimit the air duct 7 for air flowing from the air inlet opening 4 along a main flow direction H.

As seen in the main flow direction H, the air vent 100 is subdivided substantially into two regions: in a first region A, which faces the air inlet region 3 of the air vent 100, a mechanism for horizontal air deflection of the air flowing through the air duct 7 along a main flow direction H is provided. This mechanism for horizontal air deflection has at least one and preferably a plurality of vertical air-guiding elements 8 (air-guiding slats) which are arranged parallel to one another and are pivotable relative to the housing 1 of the air vent 100 about an axis of rotation extending perpendicularly to the main flow direction H.

The second region B of the air vent 100 is arranged immediately next to the first region A of the air vent 100 and serves for vertical air deflection. In contrast to the first region A of the air vent 100, the second region B, provided downstream, is subdivided into several (in this case exactly two) sub-ducts 9a, 9b that extend in parallel.

For this purpose, in the embodiment illustrated by way of example in the drawings, use is made of a separating web 10 extending along the main flow direction H, which separating web 10 is arranged—with respect to a longitudinal center axis of the air duct 7 provided in the first region A of the air vent 100—centrally and in the middle and extends up to the air outlet region 5 of the air vent 100.

As a result of the separating web 10 being arranged in the middle, the air duct 7 is subdivided into two sub-ducts 9a, 9b that are preferably the same size; in the present example, into an upper, first sub-duct 9a and into a lower, second sub-duct 9b.

Arranged in each sub-duct 9a, 9b is an adjustable and in particular pivotable air-guiding element 11a, 11b for air deflection as required of the air flowing through the sub-duct 9a, 9b. This air-guiding element 11a, 11b is designed, in the exemplary embodiment illustrated in the drawings, as a horizontal air-guiding slat and therefore serves to vertically deflect the air flowing through the corresponding sub-duct 9a, 9b.

Here, it should be noted, however, that, in FIG. 3, both the vertical air-guiding slat 8 and the horizontal air-guiding slats 11a, 11b are each shown in their neutral position, i.e. in a position in which no air deflection is effected by the air-guiding slats. This neutral position can also be referred to as a "straight-ahead position".

In particular, it is apparent from the illustration in FIG. 3 that, in the "straight-ahead position", air flows around the vertical air-guiding slats 8 and the horizontal air-guiding elements 11a, 11b on both sides, wherein in particular no deflection of the air flow is performed via the horizontal air-guiding slats 11a, 11b into the corresponding sub-ducts 9a, 9b. As a result, in the "straight-ahead position", the air resistance is minimized. In particular, in the "straight-ahead position" there is no or only slight flaring of the air flow downstream of the corresponding air outlet opening 6a, 6b.

In the first exemplary embodiment of the air vent 100 according to the invention according to FIG. 1 to FIG. 4, use is made of an actuating mechanism 50 in order to actuate the horizontal air-guiding slats 11a, 11b in the sub-ducts 9a, 9b and/or the vertical air-guiding slats 8 in the air duct 7 as required and preferably manually. Here, provision is made in particular for the actuating mechanism 50 and the associated preferably manually actuatable actuating element 51, here a protruding handle, to be provided in the lower region of the air vent 100, i.e. beneath the second sub-duct 9b.

Figure 5:
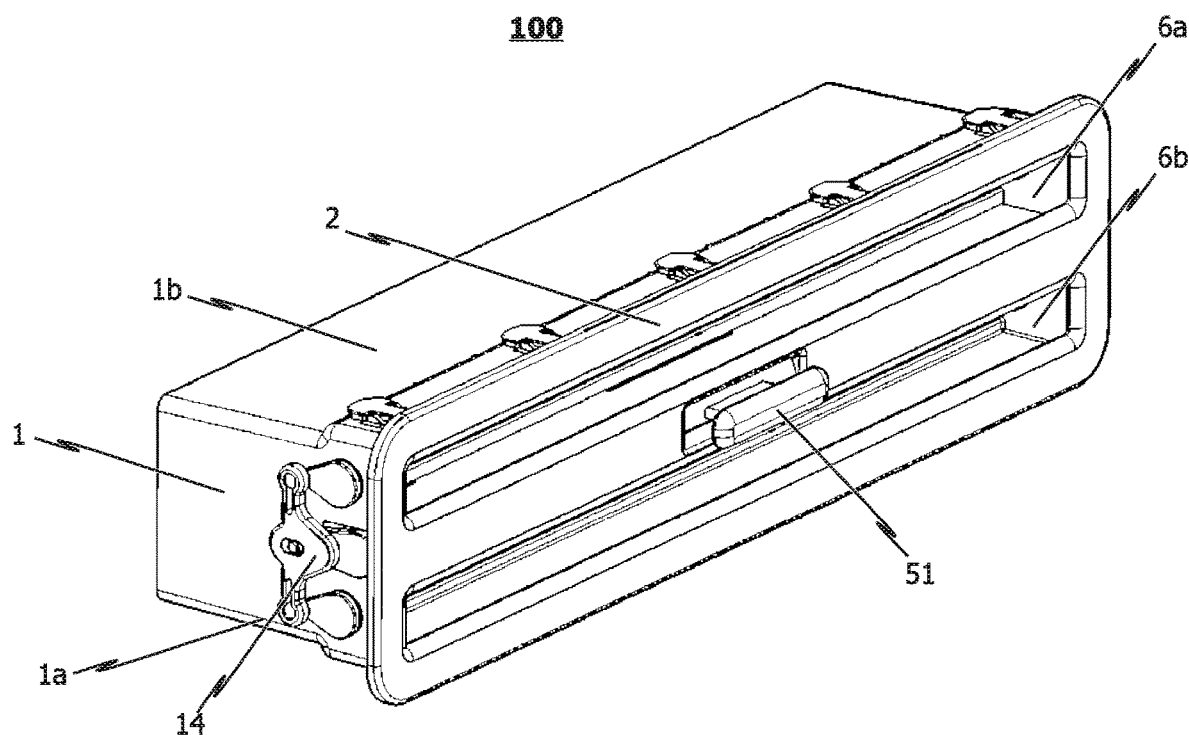
FIG. 5 schematically shows an isometric view of a further exemplary embodiment of the air vent according to the invention.
Figure 6:
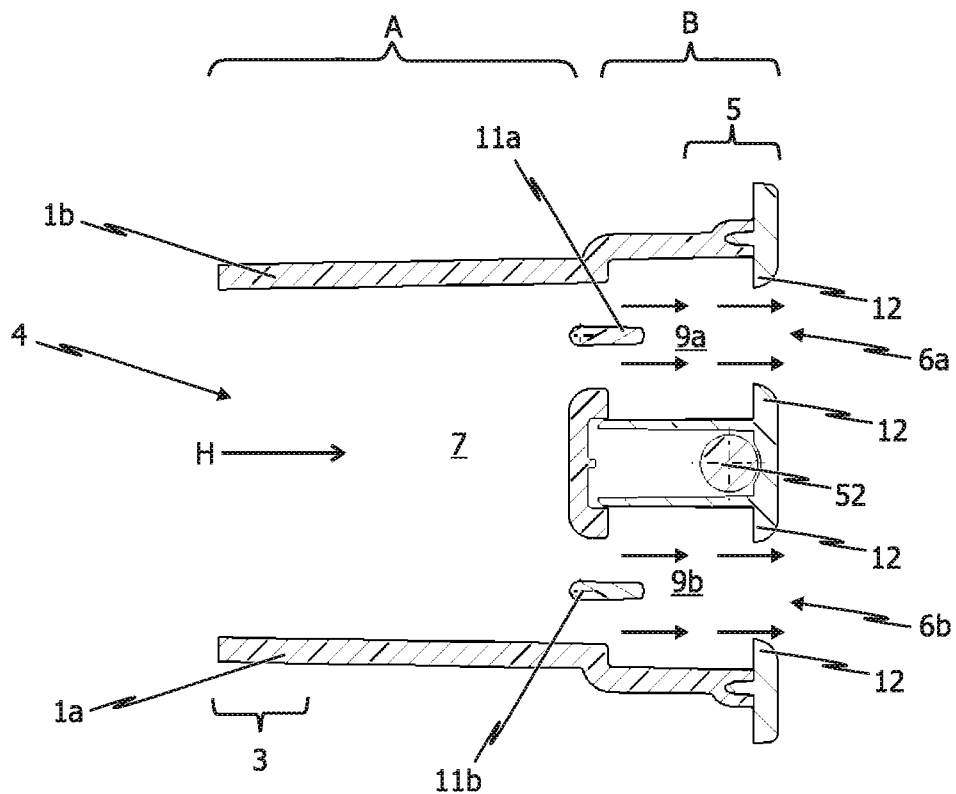
FIG. 6 schematically shows a view in longitudinal section of the further exemplary embodiment of the air vent according to the invention according to FIG. 5 without vertical air-guiding slats for horizontal air deflection.

The arrangement of the actuating mechanism 50 and of the actuating element 51 in the lower region of the air vent 100 should not be considered limiting, however. Thus, it is also conceivable, for example, to provide the actuating mechanism 50 and the actuating element 51 in the middle region of the air vent 100, i.e. between the first and the second sub-duct 9a, 9b, wherein it is then possible—as shown in FIG. 5 and FIG. 6—to dispense with a separating element or separating web 10 for subdividing the two sub-ducts 9a, 9b, since the subdivision into the first and the second sub-duct 9a, 9b can be brought about by the housing 1 of the actuating mechanism 50.

Figure 7:
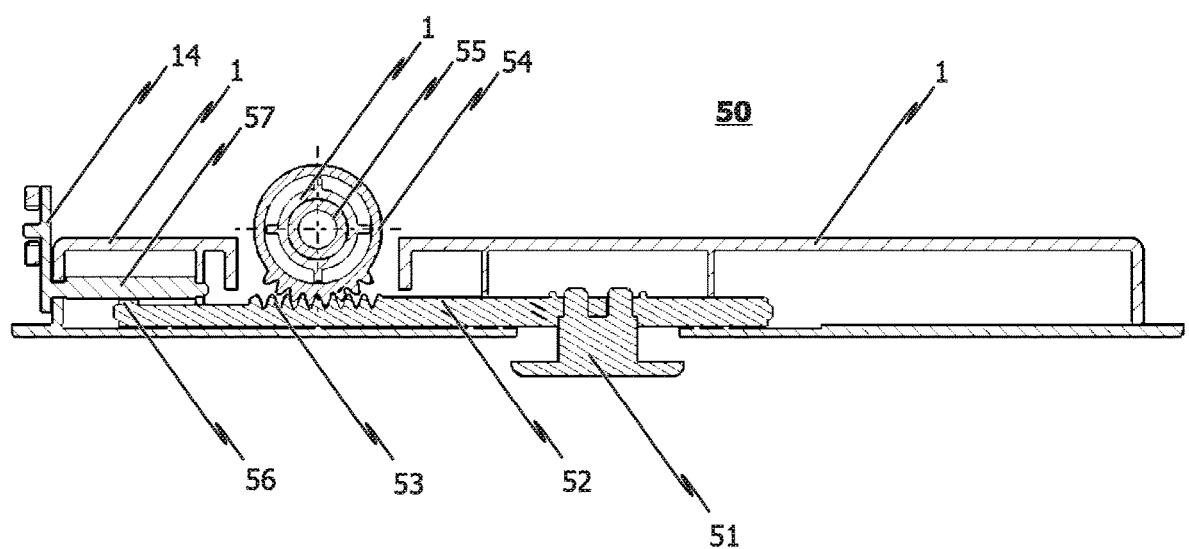
FIG. 7 schematically shows a view in cross section of an exemplary embodiment of an actuating mechanism of the air vent according to the invention for pivoting as required the horizontal and/or vertical air-guiding slats of the air vent.

The structure and the operating principle of an exemplary embodiment of the actuating mechanism 50 suitable for the air vent 100 according to the invention will be described in more detail later with reference to the schematic illustration in FIG. 7.

Returning in particular to the sectional views of the first and second exemplary embodiments of the air vent 100 according to the invention, it should be noted that, in the region of the respective air outlet openings 6a, 6b of the sub-ducts 9a, 9b, corresponding projections 12 that project at an angle into the respective sub-duct 9a, 9b are provided. It is apparent that, as a result of the projections 12 extending toward one another, the cross-sectional area of each sub-duct 9a, 9b is reduced in the main flow direction H.

The corresponding projections 12 can be formed for example on the cover panel 2 of the air vent 100, specifically by cover panel portions that extend away from one another at an angle. The middle projections 12, which protrude, at least in certain regions, into the first sub-duct 9a, 9b on one side and into the second sub-duct 9a, 9b on the other side, can be formed on the separating element, or separating web 10, or can be formed by a portion of the separating element, or separating web 10.

In the straight-ahead position according for example to the schematic sectional view in FIG. 3, no importance is attached to the projections 12 protruding, at least in certain regions, into the sub-ducts 9a, 9b, since the projections 12 are each chosen such that they do not protrude, or only protrude slightly, into the respective sub-duct 9a, 9b in the straight-ahead position of the horizontal air-guiding slats 11a, 11b.

However, this no longer applies in a state in which the horizontal air-guiding slats 11a, 11b have been moved into the corresponding sub-ducts 9a, 9b.

Figure 4:
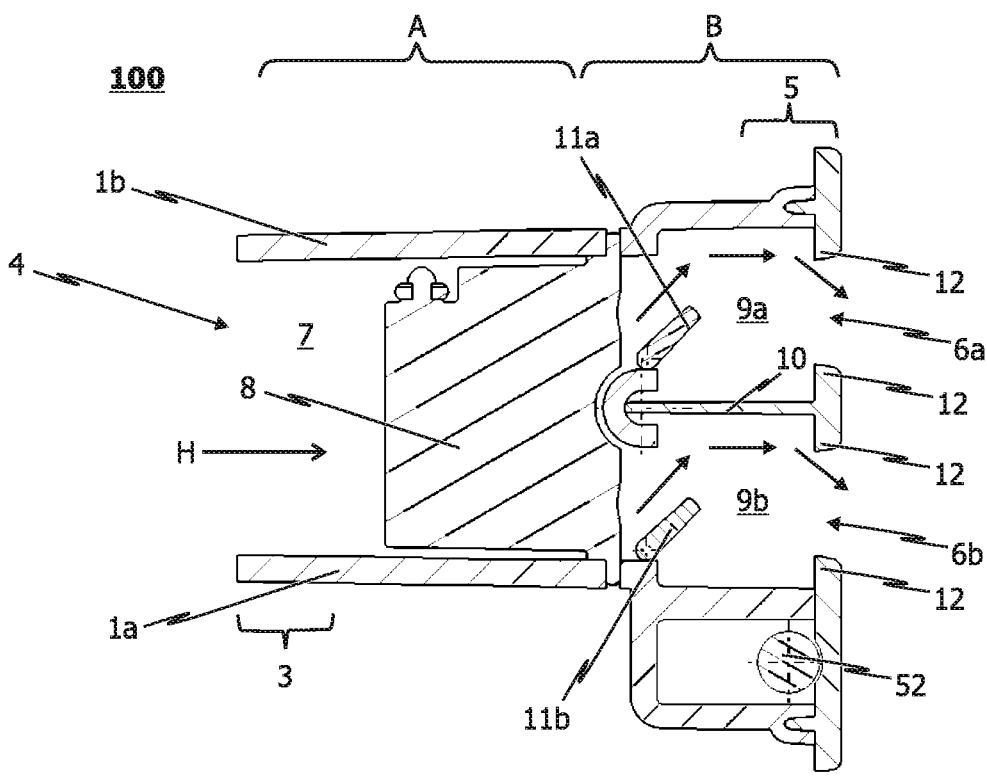
FIG. 4 schematically shows a view in longitudinal section of the exemplary embodiment of the air vent according to the invention according to FIG. 1 with maximum downward air deflection.

Specifically, the horizontal air-guiding slats 11a, 11b provided in the sub-ducts 9a, 9b are pivotable in each case between two end positions, of which one is illustrated in FIG. 4. In this end position, the horizontal air-guiding slats 11a, 11b deflect the air flowing in each case along the main flow direction H through the corresponding sub-duct 9a, 9b upward in a direction perpendicular to the main flow direction H, as can be seen from the corresponding arrow lines.

The air flow subsequently meets the wall delimiting the corresponding sub-duct 9a, 9b and is deflected in the direction of the projection 12 provided at the corresponding air outlet opening 6a, 6b of the corresponding sub-duct 9a, 9b.

As a result, in the region of the corresponding projection, an air cushion is then formed from air vortices, which air cushion deflects the air flow finally to the corresponding air outlet opening 6a, 6b. The air cushion acts in this case in a similar manner to an arcuately designed housing wall, although the projections 12 protruding into the corresponding sub-ducts 9a, 9b, at least in certain regions, bring about a greater deflection angle of the emerging air and thus more effective air deflection.

The air vent 100 according to the invention, as is schematically shown in FIGS. 1 to 5 for example on the basis of exemplary embodiments, is distinguished by the fact that, for vertical air deflection, in each case one horizontal air-guiding slat 11a, 11b is used in the individual sub-ducts 9a, 9b, which air-guiding slat 11a, 11b extends along the main flow direction H in its "straight-ahead position" according for example to FIG. 3, in order in this way to minimize flow resistance.

The horizontal air-guiding slat 11a, 11b is arranged in the middle of the respective sub-duct 9a, 9b such that air flows around this air-guiding slat 11a, 11b on both sides when the air-guiding slat 11a, 11b is present in its "straight-ahead position".

Via the actuating mechanism 50 that is described in more detail later with reference to the illustration in FIG. 7, the horizontal air-guiding slats 11a, 11b are movable or pivotable into two end positions. Specifically, the horizontal air-guiding slats 11a, 11b are pivotable about an axis of rotation which extends through the respective air-guiding slat 11a, 11b at its end region pointing to the air outlet region 5 of the air vent 100. With maximum air deflection, i.e. in a state in which the air-guiding slats 11a, 11b are in their end position, the end region of the air-guiding slat 11a, 11b butts against a corresponding stop on the wall forming the corresponding sub-duct 9a, 9b and thus prevents air from flowing around both sides of the air-guiding slat 11a, 11b. Consequently, optimum air diversion can be achieved.

Given that—compared with the height of the air duct 7 in the first region A of the air vent 100—the height of the sub-ducts 9a, 9b is much less (in this case halved) in the second region B of the air vent 100, the corresponding horizontal air-guiding slat 11a, 11b and—if provided—the at least one vertical air-guiding slat 8 can be positioned closer to the air outlet region 5 of the air vent 100, this likewise having an optimal effect with regard to air deflection.

From a structural and functional point of view, the second exemplary embodiment of the air vent 100 according to the invention according to the illustrations in FIG. 5 and FIG. 6 corresponds substantially to the first exemplary embodiment according to FIG. 1 to FIG. 4, although, in the second exemplary embodiment, the actuating mechanism 50 is arranged with the preferably manually actuatable actuating element 51 in the middle between the first and the second sub-duct 9a, 9b, such that the housing 1 of the actuating mechanism 50 at least regionally also forms the separation between the first and the second sub-duct 9a, 9b.

Although, in FIG. 6, the air vent 100 is shown without a vertical air-guiding slat 8, this should not be considered limiting; rather, it is conceivable in principle for—as in the first exemplary embodiment—horizontal air deflection in the form of at least one vertical air-guiding slat 8 to be provided in the first region A of the air vent 100.

The first region A of the air vent 100 with the horizontal air deflection is separated from the second region B of the air vent 100 with the vertical air deflection by the axis of rotation of the vertical air-guiding slat 11a, 11b, which extends perpendicularly to the main flow direction H and perpendicularly to the axis of rotation of the horizontal air-guiding slats 11a, 11b in the first and second sub-ducts 9a, 9b.

As already indicated, the air vent 100 according to the invention is assigned an actuating mechanism 50 in order to actuate as required the at least one vertical air-guiding slat 8 and/or the respective horizontal air-guiding slats 11a, 11b in the two sub-ducts 9a, 9b.

In this connection, it is appropriate to couple the vertical air-guiding slats 8—if several such air-guiding slats 8 are used (this being preferred)—together via a corresponding synchronization element such that their pivoting movement is synchronized. In the same way, a corresponding synchronization element should likewise be assigned to the horizontal air-guiding slats 11a, 11b in the two sub-ducts 9a, 9b, in order to synchronize their movement.

Figure 2:
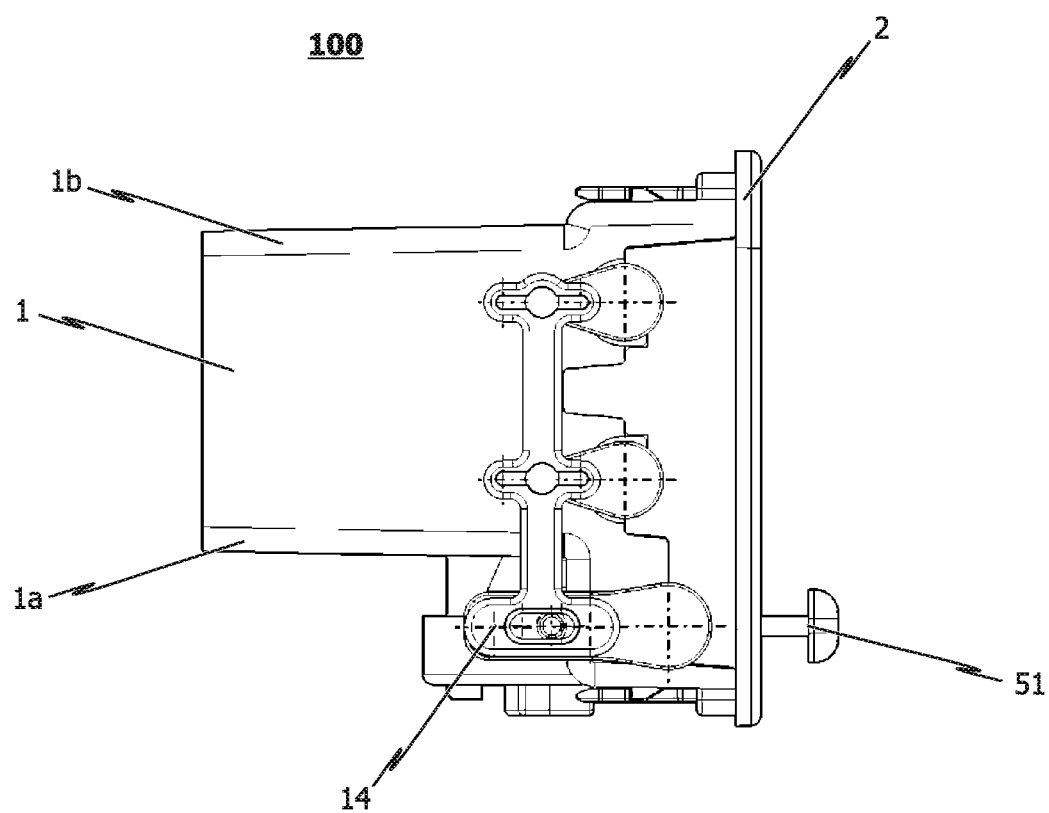
FIG. 2 schematically shows a side view of the exemplary embodiment of the air vent according to the invention according to FIG. 1.

The synchronization of the air-guiding slats 11a, 11b can—as can be gathered for example from the isometric views according to FIG. 1 and FIG. 5 and the side view according to FIG. 2—be realized via a suitable driver element 14.

In the following text, the structure and the operating principle of an exemplary embodiment of the actuating mechanism 50 are described in more detail with reference to the schematic sectional view according to FIG. 7.

In brief, the actuating mechanism 50 has a preferably manually actuatable actuating or operator-control element 51. This is for example an operator-control element 51 which can be moved linearly to the left or right in the sectional view according to FIG. 7. This linear sliding movement is delimited by corresponding stops.

Moreover, the operator-control element 51 is assigned a force transmission element in the form of a first shaft 52 which has a toothed region 53 which is in engagement with a toothed wheel 54. In this way, a sliding movement is converted into a rotary movement of the toothed wheel 54 via the first shaft 52.

The toothed wheel 54 which can be rotated in this way is connected to the at least one vertical air-guiding slat 8 via a bearing point 55, with the result that, upon displacing the operator-control element 51 for example to the left, the at least one vertical air-guiding slat 8 is pivoted in such a way that air deflection occurs likewise in a horizontal direction to the left.

The first shaft 52 of the actuating mechanism 50 can also be correspondingly rotated with the aid of the operator-control element 51, specifically when the operator-control element 51 (in the illustration according to FIG. 7) is pivoted into the plane of the drawing or out of the plane of the drawing. This pivoting movement does not result in any force transmission to the toothed wheel 54. Rather, this pivoting movement is transmitted via a toothing 56 to a second shaft 57 which for its part is connected to the horizontal air-guiding slats 11a, 11b via the driver element 14.

This has the result that, when the operator-control element 51 is pivoted upward, the horizontal air-guiding slats 11a, 11b are pivoted downward and effect upward air deflection.

LIST OF REFERENCE SIGNS

1 Housing
1a Housing lower part
1b Housing upper part
2 Cover panel
3 Air inlet region
4 Air inlet opening
5 Air outlet region
6a,b Air outlet opening
7 Air duct
8 Further air-guiding element/vertical air-guiding slat
9a,b Sub-duct
10 Separating web
11a,b Air-guiding element/horizontal air-guiding slat
12 Projection
14 Driver element
50 Actuating mechanism
51 Actuating element/operator-control element
52 First shaft of the actuating mechanism
53 Toothed region
54 Toothed wheel
55 Bearing point
56 Toothing
57 Second shaft
100 Air vent A First region of the air vent
B Second region of the air vent
H Main flow direction

The invention claimed is:

1. An air vent for a vehicle, the air vent comprising:
a housing with an air inlet region and an opposite air outlet region, wherein a housing wall of the housing delimits, at least in certain regions, an air duct for air flowing from the air inlet region to the air outlet region along a main flow direction, wherein, upstream of the air outlet region, the air duct is subdivided into at least two sub-ducts which extend in parallel along the main flow direction and which open into a respective air outlet opening at the air outlet region, and wherein, for air deflection as required, at least one adjustable air-guiding element is arranged in each sub-duct;
wherein the at least one air-guiding element arranged in each sub-duct is, in each case, designed as an air-guiding slat that is pivotable relative to the housing of the air vent between two end positions about an axis of rotation extending perpendicularly to the main flow direction;
wherein an actuating mechanism is provided for pivoting as required the at least one air-guiding element assigned to each sub-duct, and the actuating mechanism has an associated manual actuating element that is located outside of the sub-ducts;
wherein, in an upstream region that is upstream of the air-guiding elements respectively assigned to the sub-ducts, the air duct is not subdivided into sub-ducts, and wherein at least one further air-guiding element is provided in the upstream region, wherein the at least one further air-guiding element is pivotable relative to the housing of the air vent and relative to the air-guiding elements assigned to the sub-ducts about an axis of rotation which extends perpendicularly to the main flow direction and perpendicularly to the axis of rotation of the air-guiding elements assigned to the sub-ducts, wherein the at least one further air-guiding element includes an upstream end and a downstream end, wherein the axis of rotation of the at least one further air-guiding element is positioned at the downstream end.

2. The air vent as claimed in claim 1, wherein, in order to subdivide the air duct into the at least two sub-ducts, at least one separating web which extends along the main flow direction is provided which is arranged between two adjacent sub-ducts, wherein the separating web extends up to the air outlet region.

3. The air vent as claimed in claim 1,
wherein each sub-duct is assigned at least one projection in the air outlet region, which projection protrudes into the corresponding sub-duct in such a way that the cross-sectional area of the sub-duct is reduced in the main flow direction, wherein the at least one air-guiding elements arranged in each sub-duct are each designed in such a way that, at least in one of the end positions, the air flowing through the sub-duct is directed from the main flow direction in the direction of the at least one projection assigned to the corresponding sub-duct; or
wherein each sub-duct is formed, at least in certain regions, by a wall element which is curved in the direction of the air outlet region, wherein the air-guiding elements arranged in each sub-duct are each designed in such a way that, at least in one of the end positions, the air flowing through the sub-duct is directed from the main flow direction in the direction of the wall element which is curved in the direction of the air outlet region.

4. The air vent as claimed in claim 3, wherein the axis of rotation of each air-guiding element designed as an air-guiding slat extends through an end region, which faces the air outlet region, of the respective air-guiding element, and wherein, in the two end positions, the opposite end region of the air-guiding element butts against corresponding stops which are connected to the wall forming the corresponding sub-duct or are formed by the corresponding wall.

5. The air vent as claimed in claim 1, wherein the air-guiding elements assigned to the sub-ducts are each designed to deflect the air flowing through the corresponding sub-duct from the main flow direction in a first direction extending perpendicularly to the main flow direction, and wherein the at least one further air-guiding element is designed to deflect the air flowing through the air duct from the main flow direction in a second direction perpendicular to the first direction, and wherein an actuating mechanism also pivots the at least one further air-guiding element.

6. The air vent as claimed in claim 5, wherein the actuating mechanism is designed, upon displacing the actuating element in the first direction, to pivot the air-guiding elements assigned to the sub-ducts in such a way that the air flowing through the corresponding sub-duct is deflected from the main flow direction in the first direction extending perpendicularly to the main flow direction.

7. The air vent as claimed in claim 6, wherein the actuating element is assigned a force transmission element having a first shaft which has a toothed region which is in engagement with a toothed wheel, wherein the toothed wheel which can be rotated is connected to the at least one further air-guiding element via a bearing point, such that, upon displacing the actuating element, the at least one further air-guiding element is pivoted in such a way that air deflection occurs in a horizontal direction.

8. The air vent as claimed in claim 7, wherein the first shaft of the actuating mechanism can also be correspondingly rotated by the actuating element, wherein this pivoting movement does not result in any force transmission to the toothed wheel, and wherein this pivoting movement is transmitted via a toothing to a second shaft which is connected to the air-guiding elements.

9. The air vent as claimed in claim 1, wherein the air outlet area of the air vent, which is a sum of the cross-sectional areas of all the outlet openings in the main flow direction, is between 10 and 60 cm2.

10. The air vent as claimed in claim 1, wherein each sub-duct is assigned precisely one adjustable air-guiding element which is arranged centrally in the corresponding sub-duct in such a way that the air flowing through the sub-duct flows around it on both sides if the air-guiding element is present in its neutral position in which the air-guiding element extends along the main flow direction, wherein the distance between adjacent air-guiding elements each in their neutral position is 8 to 60 mm.

11. A venting system for a vehicle having an air vent as claimed in claim 1.

12. The air vent of claim 1, wherein the actuating element is vertically offset from the sub-ducts.

13. The air vent of claim 1, wherein the axis of rotation of the at least one further air-guiding element is positioned at an upstream end of the at least one air-guiding element of each subduct when the at least one air-guiding element of each sub-duct is in a straight-ahead position.

14. The air vent of claim 1, wherein the downstream end of the at least one further air-guiding element is adjacent an upstream end of the at least one air-guiding element of each subduct when the at least one air-guiding element of each sub-duct is in a straight-ahead position.

15. An air vent for a vehicle, the air vent comprising:
a housing with an air inlet region and an opposite air outlet region, wherein a housing wall of the housing delimits, at least in certain regions, an air duct for air flowing from the air inlet region to the air outlet region along a main flow direction, wherein, upstream of the air outlet region, the air duct is subdivided into at least two sub-ducts which extend in parallel along the main flow direction and which open into a respective air outlet opening at the air outlet region, and wherein, for air deflection as required, precisely one pivotable air-guiding element is arranged in each sub-duct;
wherein the air-guiding element arranged in each sub-duct is, in each case, configured as an air-guiding slat that is pivotable relative to the housing of the air vent between two end positions about an axis of rotation extending perpendicularly to the main flow direction;
wherein an actuating mechanism is provided for pivoting as required the air-guiding element arranged in each sub-duct, and the actuating mechanism has an associated manual actuating element that is located outside of the sub-ducts;
wherein, in an upstream region that is upstream of the air-guiding elements respectively assigned to the sub-ducts, the air duct is not subdivided into sub-ducts, and wherein at least one further air-guiding element is provided in the upstream region, wherein the at least one further air-guiding element is pivotable relative to the housing of the air vent and relative to the air-guiding elements assigned to the sub-ducts about an axis of rotation which extends perpendicularly to the main flow direction and perpendicularly to the axis of rotation of the air-guiding elements assigned to the sub-ducts;
wherein the actuating element is assigned a force transmission element having a first shaft which has a toothed region which is in engagement with a toothed wheel, wherein the toothed wheel is connected to the at least one further air-guiding element via a bearing point, such that, upon displacing the actuating element to linearly move the first shaft, the toothed wheel is rotated and the at least one further air-guiding element is pivoted;
wherein the first shaft is also rotatable about its elongate axis via the actuating element, wherein rotation of the first shaft does not result in any force transmission to the toothed wheel, wherein rotation of the first shaft is transmitted via a further toothing to a second shaft which is connected to the air-guiding elements assigned to the sub-ducts so as to pivot the air-guiding elements assigned to the sub-ducts when the first shaft is rotated, wherein the further toothing is at a location along the first shaft that is spaced apart from the toothed region.

16. The air vent of claim 15, wherein the actuating element is vertically offset from the sub-ducts.

* * * * *